United States Patent
Jones

(10) Patent No.: US 9,108,884 B2
(45) Date of Patent: Aug. 18, 2015

(54) METAKAOLIN PRODUCTION AND ENHANCEMENT OF INDUSTRIAL MINERALS

(75) Inventor: Michael A. Jones, San Tan Valley, AZ (US)

(73) Assignee: Pneumatic Processing Technologies, LLC, New Orleans, LA (US)

( * ) Notice: Subject to any disclaimer, the term of this patent is extended or adjusted under 35 U.S.C. 154(b) by 121 days.

(21) Appl. No.: 13/983,493

(22) PCT Filed: Feb. 3, 2012

(86) PCT No.: PCT/US2012/023814
§ 371 (c)(1),
(2), (4) Date: Oct. 3, 2013

(87) PCT Pub. No.: WO2012/106622
PCT Pub. Date: Aug. 9, 2012

(65) Prior Publication Data
US 2014/0020604 A1    Jan. 23, 2014

Related U.S. Application Data

(60) Provisional application No. 61/439,746, filed on Feb. 4, 2011.

(51) Int. Cl.
| | |
|---|---|
| *C01B 33/26* | (2006.01) |
| *C04B 22/06* | (2006.01) |
| *B01D 53/02* | (2006.01) |
| *B01D 53/64* | (2006.01) |
| *C01B 31/08* | (2006.01) |
| *C04B 7/42* | (2006.01) |
| *C04B 14/10* | (2006.01) |
| *C04B 18/08* | (2006.01) |
| *C09C 1/42* | (2006.01) |
| *B01J 20/12* | (2006.01) |
| *B01J 20/20* | (2006.01) |

(52) U.S. Cl.
CPC ............... *C04B 22/06* (2013.01); *B01D 53/02* (2013.01); *B01D 53/64* (2013.01); *B01J 20/12* (2013.01); *B01J 20/20* (2013.01); *C01B 31/08* (2013.01); *C01B 31/083* (2013.01); *C04B 7/427* (2013.01); *C04B 14/106* (2013.01); *C04B 18/084* (2013.01); *C09C 1/42* (2013.01); *B01D 2253/102* (2013.01); *B01D 2253/106* (2013.01); *B01D 2253/25* (2013.01); *B01D 2257/602* (2013.01); *B01D 2258/0283* (2013.01); *B01J 2220/42* (2013.01); *Y02W 30/92* (2015.05)

(58) Field of Classification Search
CPC ........ C09C 1/402; C04B 14/106; C04B 33/04
See application file for complete search history.

(56) References Cited

U.S. PATENT DOCUMENTS

| | | | |
|---|---|---|---|
| 2,863,726 A | 12/1958 | Kamlet | |
| 3,001,953 A | 9/1961 | Reitmeier et al. | |
| 3,775,040 A * | 11/1973 | Vollans | 432/15 |
| 4,047,883 A * | 9/1977 | Waters | 432/14 |
| 7,628,850 B2 | 12/2009 | Phinney et al. | |
| 2001/0013302 A1 | 8/2001 | Mathur et al. | |
| 2007/0290085 A1 | 12/2007 | Nemeh et al. | |
| 2008/0264295 A1 | 10/2008 | Taylor et al. | |
| 2009/0081092 A1 | 3/2009 | Yang et al. | |

FOREIGN PATENT DOCUMENTS

EP    2253600    11/2010

OTHER PUBLICATIONS

Lanemangum. "How to use metakaolin in concrete countertops". The Concrete Countertop Institute. Oct. 12, 2007. Retrieved from http://www.concretecountertopinstitute.com/library.item.51/how-to-use-metakaolin-in-concrete.*
International Search Report and Written Opinion, PCT/US2012/023814, May 23, 2012.

* cited by examiner

*Primary Examiner* — Kaj K Olsen
*Assistant Examiner* — Karam Hijji
(74) *Attorney, Agent, or Firm* — Quarles & Brady LLP; Gavin J. Milczarek-Desai

(57) ABSTRACT

Methods for preparing metakaolin-enhanced industrial minerals. Mixing and heating kaolinite clay with an industrial mineral, such as activated carbon, that is between 750° F. and 1400° F. results in a metakaolin/activated carbon complex that provides good mercury sorbent qualities while producing a fly ash (after use as a sorbent in emissions applications) that has a lower foaming index.

10 Claims, No Drawings

METAKAOLIN PRODUCTION AND ENHANCEMENT OF INDUSTRIAL MINERALS

BACKGROUND OF THE INVENTION

1. Field of Invention

The subject matter herein relates to improvements in the production of activated carbon, metakaolin, cement clinker, and improved combination products resulting therefrom, such as fly ash.

2. Description of the Related Art

Recent regulations governing the capture and reduction of mercury emissions from coal fired applications have led to testing of numerous materials suitable for mercury capture. A leading mercury capture technology utilizes activated carbon which can be doped with, for example, bromine.

This activated carbon, when injected in the flue gas stream of a coal-fired furnace, will capture the mercury and in most cases be filtered out of the gas stream with the coal fly ash. This fly ash in many applications, and most notably large utility coal-fired boilers, is often utilized in the production of Portland cement.

Depending on the activated carbon source and characteristics, the added carbon content of the fly ash can adversely increase the foaming index of the concrete, making the previously suitable fly ash fly ash unsuitable for concrete applications. Numerous investigations are underway to produce an activated carbon with a low foaming index or to develop an additive that can compensate for the foaming characteristics of a particular activated carbon.

SUMMARY OF INVENTION

It has been discovered that when metakaolin and particularly highly reactive metakaolin (HRM) is added to activated carbon, the activated carbon retained its mercury capture performance and the foaming index of the activated carbon was reduced.

Furthermore, the production of metakaolin and/or HRM by heating of kaolinite clay (aka kaolin) as an initial co-product with one or more other industrial minerals during a heat treatment such as calcination, or as an additive later in a heat treatment process (such that it is added to previously heated and still hot industrial mineral material), is disclosed.

Additional features and advantages of the invention will be forthcoming from the following detailed description of certain preferred embodiments.

DESCRIPTION OF THE PREFERRED EMBODIMENTS

Kaolinite is a clay mineral, a so-called industrial mineral, with the chemical composition $Al_2Si_2O_5(OH)_4$. When kaolinite clay is heated, it becomes calcined by losing water through dehydroxilization. This dehydroxilization of kaolin leads to the formation of metakaolin with a general composition of $Al_2O_3 \cdot 2SiO_2 + 2H_2O$ with varying amounts of minor constituents such as $Fe_2O_3$.

As used herein, High Reactivity Metakaolin (HRM) is defined as metakaolin that contains $SiO_2 + Al_2O_3 + Fe_2O_3$ of >90%, that has a specific gravity of approximately 2.5, and that has a particle size less than fly ash (FA) and greater than silica fume (SF). HRM is not distinct from metakaolin in a chemical sense; rather, it refers to metakaolin that has a higher purity and has been roasted from kaolinite to a tighter controlled degree making it highly reactive.

The combination of the reduced foaming index and increased cement structural characteristic through the addition of metakaolin and especially HRM with activated carbon creates a unique product that is both beneficial for mercury capture and concrete production.

A method to produce a metakaolin enhanced activated carbon includes the addition (such as by mixing) of metakaolin in amounts ranging from 1 to 30% by weight to brominated or non-brominated activated carbon. This can be done prior to or after the activated carbon has been milled.

Another novel method to produce a metakaolin enhanced activated carbon involves the addition of finely divided kaolinite clay to hot activated carbon after such carbon is discharged from a furnace or calciner and prior to final cooling. The production of metakaolin requires careful temperature control to create the highest quality and reactivity product. The optimal temperature range is between 750° F. to 1400° F. and more ideally between 1000° F. and 1300° F.

Activated carbon discharging from a production method and cooled to near the temperature range above and mixed with finely divided kaolin clay will carefully calcine the clay using the heat provided by the hot activated carbon. The coproduction of activated carbon and kaolin using heat provided by the activated carbon upon discharge from a furnace should yield a high quality calcined metakaolin enhanced activated carbon. The amount of kaolin that can be added will be determined by several factors including activated carbon characteristics and kaolin composition. In addition the amount of heat associated with activated carbon discharging from a furnace is a limiting factor. Supplemental external heat can also be added if required.

By including kaolin as a co-product industrial mineral to be calcined, metakaolin can be produced simultaneously with material such as cement clinker that can be a source of temperature control due to the endothermic nature of calcination (to better ensure that the kaolin is thoroughly heated to form metakaolin but not thermally treated in excess of optimal parameters).

So, for example, kaolin is introduced with the carbon being heat treated in sufficient quantity that it results in at least 50% of the output (in the form of metakaolin) in addition to the metakaolin doped activated char. Thus, a co-product metakaolin is to be distinguished from mere dopants or "enhancers," which are added to the system but do not result in a separate "co-product" in any appreciable amounts (and certainly not over 50% of the system output of products). For example, adding a bromide dopant to the carbon would be considered an enhancer and not a co-product industrial mineral because mainly brominated carbon results, with no other "co-product" making up at least 50% of the system output of products.

In another example, hot cement clinker (between 1000° F.-1300° F.), the hot cement clinker being produced by sintering limestone and alumino-silicate in a cement kiln, is mixed with 5% kaolin by weight such that a metakaolin co-product results, for example after at least 30 seconds with the hot cement clinker within the desire temperature range. The metakaolin enhanced cement clinker is further cooled and milled and processed to produce cement. While 5% kaolin is referenced in the above example, between 5-20% could be added. Desirably, the enhanced cement clinker contains metakaolin of at least about 90% $SiO_2 + Al_2O_3 + Fe_2O_3$. The use of other industrial minerals, such as activated carbon, could be used in lieu or addition to cement clinker.

The utilization of flash activation to simultaneously calcine lime and devolatilize and activate AC has proven very effective. Such a product is suitable for $SO_2$ and Hg removal in power plants.

Thus, a further example of novelty is a method of sorbing a contaminant in a flue gas, comprising introducing a metakaolin-doped activated carbon into a flue gas such that fly ash containing said metakaolin-enhanced activated carbon is produced. This can be accomplished by Activated Carbon Injection (ACI) of the metakaolin-doped activated carbon into the flue gas duct prior to ash particulate collection of a solid fuel fired industrial application, such as a power plant.

HRM can be made by the invention by utilizing purified kaolinite of greater than 90% $Al_2Si_2O_5(OH)_4$ and thermally treating such material under controlled conditions where the thermal treatment temperature does not vary by more than 50° F. and preferably less than 20° F. from the optimal desired temperature. The optimal treatment temperature is determined based on raw kaolinite characteristics and can vary from different kaolinite sources. The optimal temperature range is between 750° F. to 1400° F. and more ideally between 1000° F. and 1300° F. With kaolinite purities less than 90% $Al_2Si_2O_5(OH)_4$, but greater than 70%, or thermal treatment temperatures varying greater than 50° F., but still between 750° F. to 1400° F., it is still possible to make a metakaolin enhanced industrial mineral product.

For embodiments involving the production of metakaolin enhanced industrial mineral, it should be understood that the metakaolin or HRM and the industrial mineral, such as activated carbon or cement clinker, remain intimately mixed, and are not separated, producing a metakaolin and/or HRM enhanced industrial mineral product.

Various modifications are possible within the meaning and range of equivalence of the appended claims.

What is claimed is:

1. A method of producing metakaolin, comprising the step of heating kaolinite clay with a hot industrial mineral, wherein said kaolinite clay is added to the hot industrial mineral after said industrial mineral has been heated to a temperature of between 750° F. to 1400° F. and discharged from a furnace or calciner, and the kaolinite clay is heated solely using the heat from the hot industrial mineral for a time sufficient to create metakaolin, wherein said kaolinite clay is about at least 90% pure and the temperature of the kaolinite clay does not vary by more than 50° F. during the heating for a time sufficient to create metakaolin.

2. The method of claim 1, wherein said hot industrial mineral is cement clinker.

3. The method of claim 1, wherein metakaolin is produced in sufficient quantity to be a co-product.

4. The method of claim 2, wherein the hot cement clinker has been heated to between 1000° F.-1300° F., and 5% kaolinite by weight is added to said hot cement clinker for about 30 seconds to thereby produce metakaolin.

5. The method of claim 1, wherein said hot industrial mineral is carbon char.

6. The method of claim 5, wherein the hot carbon char has been heated to between 1000-1300° F., and 5% kaolinite by weight is added to said hot carbon char for about 30 seconds to thereby produce metakaolin.

7. A method of producing metakaolin, comprising the step of heating kaolinite clay with a hot industrial mineral, wherein said kaolinite clay is added to the hot industrial mineral after said industrial mineral has been heated to a temperature of between 750° F. to 1400° F. and discharged from a furnace or calciner, and the kaolinite clay is heated solely using the heat from the hot industrial mineral for a time sufficient to create metakaolin, wherein said hot industrial mineral is cement clinker or carbon char.

8. The method of claim 7, wherein metakaolin is produced in sufficient quantity to be a co-product.

9. The method of claim 7, wherein the hot cement clinker has been heated to between 1000° F.-1300° F., and 5% kaolinite by weight is added to said hot cement clinker for about 30 seconds to thereby produce metakaolin.

10. The method of claim 7, wherein said kaolinite clay is about at least 90% pure and the temperature of the kaolinite clay does not vary by more than 50° F. during the heating for a time sufficient to create metakaolin.

* * * * *